(12) United States Patent
Sands et al.

(10) Patent No.: US 10,494,194 B2
(45) Date of Patent: Dec. 3, 2019

(54) TRANSFER SYSTEM BETWEEN CONVEYORS

(71) Applicant: SUPERIOR PRODUCT HANDLING SOLUTIONS, INC., Brooklyn Park, MN (US)

(72) Inventors: Steven G. Sands, Plymouth, MN (US); Joseph R. Lacher, Zimmerman, MN (US)

(73) Assignee: Superior Product Handling Solutions, Inc., Brooklyn Park, MN (US)

(*) Notice: Subject to any disclaimer, the term of this patent is extended or adjusted under 35 U.S.C. 154(b) by 113 days.

(21) Appl. No.: 15/847,317

(22) Filed: Dec. 19, 2017

(65) Prior Publication Data
US 2019/0185275 A1 Jun. 20, 2019

(51) Int. Cl.
*B65G 47/32* (2006.01)

(52) U.S. Cl.
CPC ........ *B65G 47/32* (2013.01); *B65G 2203/025* (2013.01); *B65G 2203/041* (2013.01); *B65G 2203/044* (2013.01)

(58) Field of Classification Search
CPC .... B65G 43/08; B65G 47/261; B65G 47/268; B65G 47/31; B65G 47/32; B65G 47/82; B65G 47/845; B65G 2203/0216; B65G 2203/025; B65G 2203/041; B65G 2203/044; B65G 2811/0631; B65G 19/02
See application file for complete search history.

(56) References Cited

U.S. PATENT DOCUMENTS

| | | | | |
|---|---|---|---|---|
| 3,485,339 A | * | 12/1969 | Miller | B65G 43/08 198/460.1 |
| 3,993,188 A | * | 11/1976 | Muller | B65G 47/31 198/461.3 |
| 6,641,042 B1 | * | 11/2003 | Pierenkemper | G06K 7/0008 235/461 |
| 8,201,681 B2 | * | 6/2012 | Schiesser | B65G 43/08 198/460.1 |
| 8,245,838 B2 | * | 8/2012 | Reichenbach | B07C 3/14 198/502.1 |
| 9,051,132 B2 | * | 6/2015 | van de Loecht | B65G 47/31 |
| 9,446,908 B2 | * | 9/2016 | Danelski | B65G 43/08 |
| 2017/0369254 A1 | * | 12/2017 | Muller | B65G 47/08 |
| 2019/0100387 A1 | * | 4/2019 | Hayashi | B65G 47/32 |

* cited by examiner

*Primary Examiner* — Gene O Crawford
*Assistant Examiner* — Keith R Campbell
(74) *Attorney, Agent, or Firm* — Christopher J. Volkmann; Kelly, Holt & Christenson, PLLC

(57) ABSTRACT

A transfer system is provided. The transfer system comprises a loading stage, configured to receive a product from a first movement system. The transfer system also comprises a gap stage, configured to receive the product from the loading stage and move the product at a speed. The speed is configured to separate the product from a subsequent product. The transfer system also comprises a detection stage, configured to identify the product by detecting a product identifier using a sensor. The transfer system also comprises a transfer system configured to move the product from through the loading stage, gap stage and detection stage to a second movement stage. The transfer system also comprises a controller configured to generate and send control signals to the transfer system and receive an identification of the product from the sensor.

18 Claims, 15 Drawing Sheets

TRANSFER SYSTEM BETWEEN CONVEYORS

BACKGROUND

Many different types of products are stacked and transferred during production and assembly. For example, cards and envelopes can be stacked in a bound or unbound (loose) stack prior to shipment and sale to a commercial retailer. Each stack of items must be assembled and tracked prior to distribution to customers.

SUMMARY

A transfer system is provided. The transfer system comprises a loading stage, configured to receive a product from a first movement system. The transfer system also comprises a gap stage, configured to receive the product from the loading stage and move the product at a speed. The speed is configured to separate the product from a subsequent product. The transfer system also comprises a detection stage, configured to identify the product by detecting a product identifier using a sensor. The transfer system also comprises a transfer system configured to move the product from through the loading stage, gap stage and detection stage to a second movement stage. The transfer system also comprises a controller configured to generate and send control signals to the transfer system and receive an identification of the product from the sensor.

DETAILED DESCRIPTION OF ILLUSTRATIVE EMBODIMENTS

Transferring stacks of paper-based products that are bound or unbound from a flat belt conveyor to a moving lugged, and/or flighted, conveyor presents some challenges that should be overcome to reduce jams and increase production rates. While paper-based products are discussed herein, it is also to be understood that other materials, such as plastic sheets, plastic cards, etc., are also envisioned and included in the term 'product.'

Product size can range from 3×4 inches, up to 3×10 inches, for example, while stack heights can range between 0.002-7 inches. However, while these ranges are listed as exemplary of different stack dimensions, it is also expressly contemplated that embodiments described herein can be designed to accommodate stacks of larger dimensions (e.g. taller, wider, longer) and smaller dimensions than those discussed herein. It is important to be able to stack product as needed for a given deliverable, while also keeping track of product throughout a manufacturing/assembly process. For example, each stack may have a barcode, or other identifier associated with it, that can be read during a transfer process during assembly.

Figure 1A:
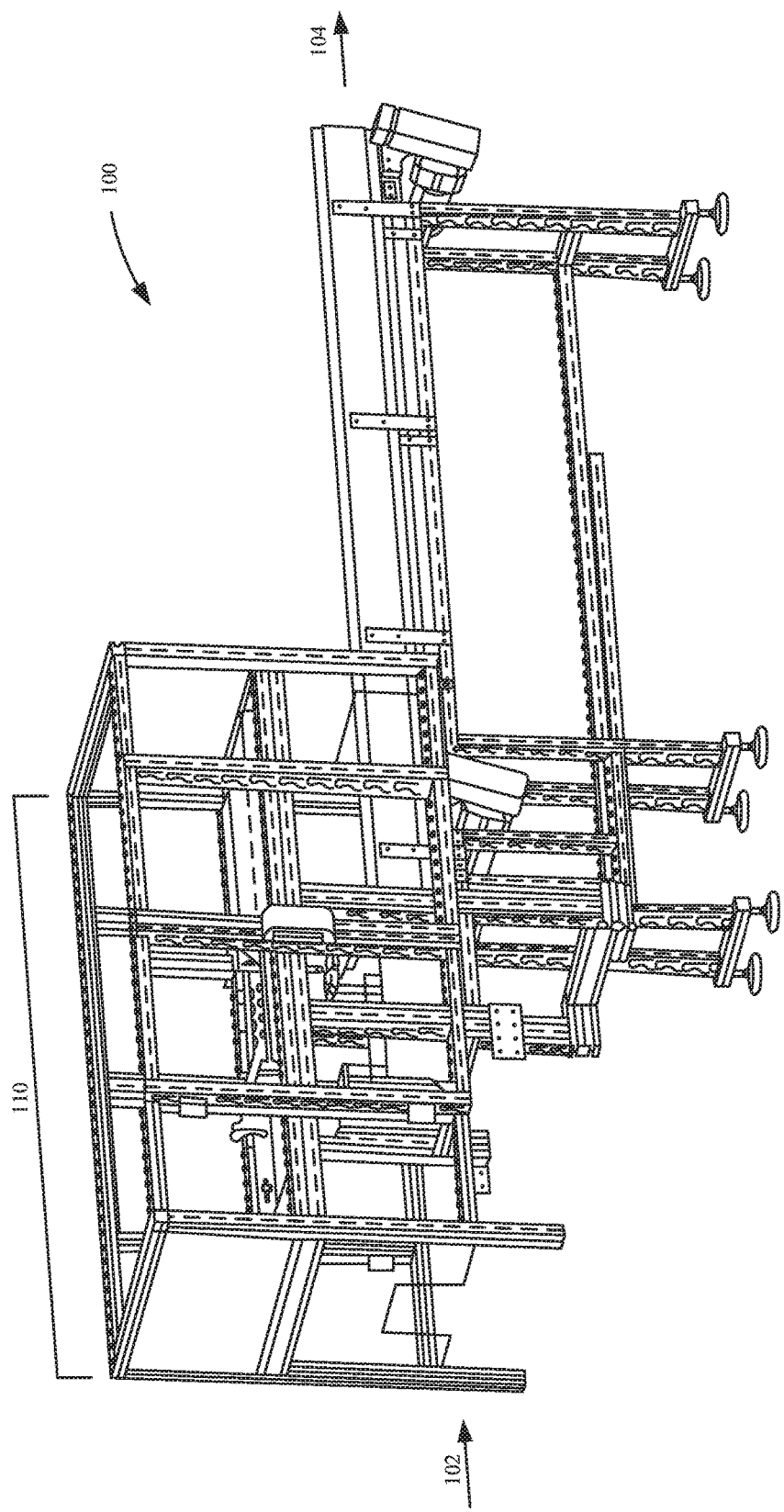
FIGS. 1A-1D show illustrative views of an example transfer system in accordance with an embodiment of the present invention.
Figure 1B:
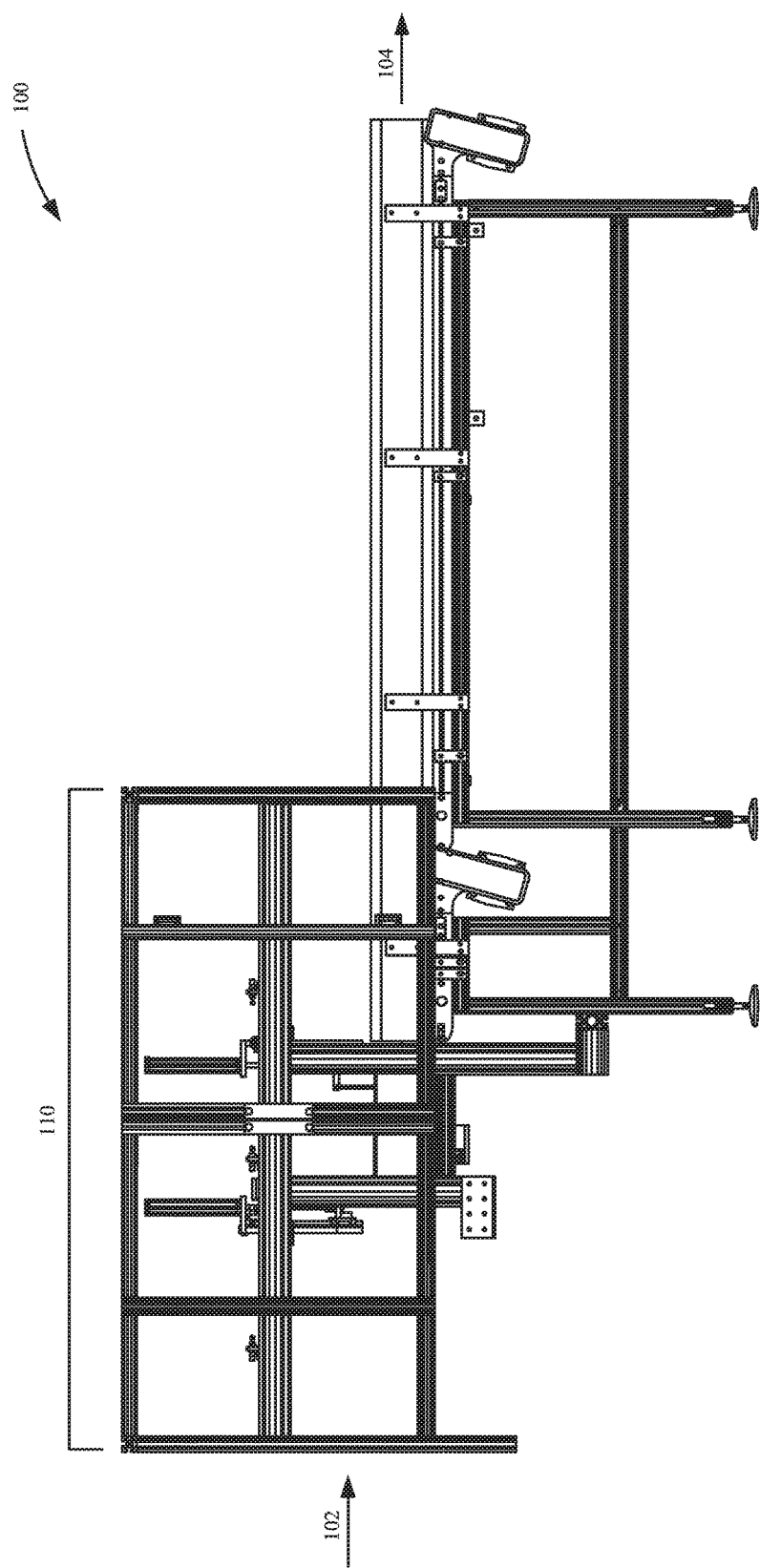

FIGS. 1A-1D show illustrative views of an example transfer system in accordance with an embodiment of the present invention. FIG. 1A illustrates a perspective view of a transfer system 100, and FIG. 1B illustrates a side view of transfer system 100. In one embodiment, transfer system 100 is configured to receive an incoming product 102, and output an outgoing product 104 using a transfer mechanism 110. For example, incoming product may come in from a first conveyor, and outgoing product may leave from an outgoing conveyor. Incoming and outgoing conveyors can comprise, for example, flat belt conveyors, moving lugged conveyors, flighted conveyors, or other suitable movement systems. Additionally, system 100 may comprise a reading mechanism (not shown in FIG. 1A), or a counting mechanism, configured to keep track of product moving through transfer system 100. For example, transfer system 100 may comprise one or more sensors configured to read a bar code (not shown) a camera system configured to image a barcode, or other identifier, or any other suitable tracking technology.

Figure 1C:
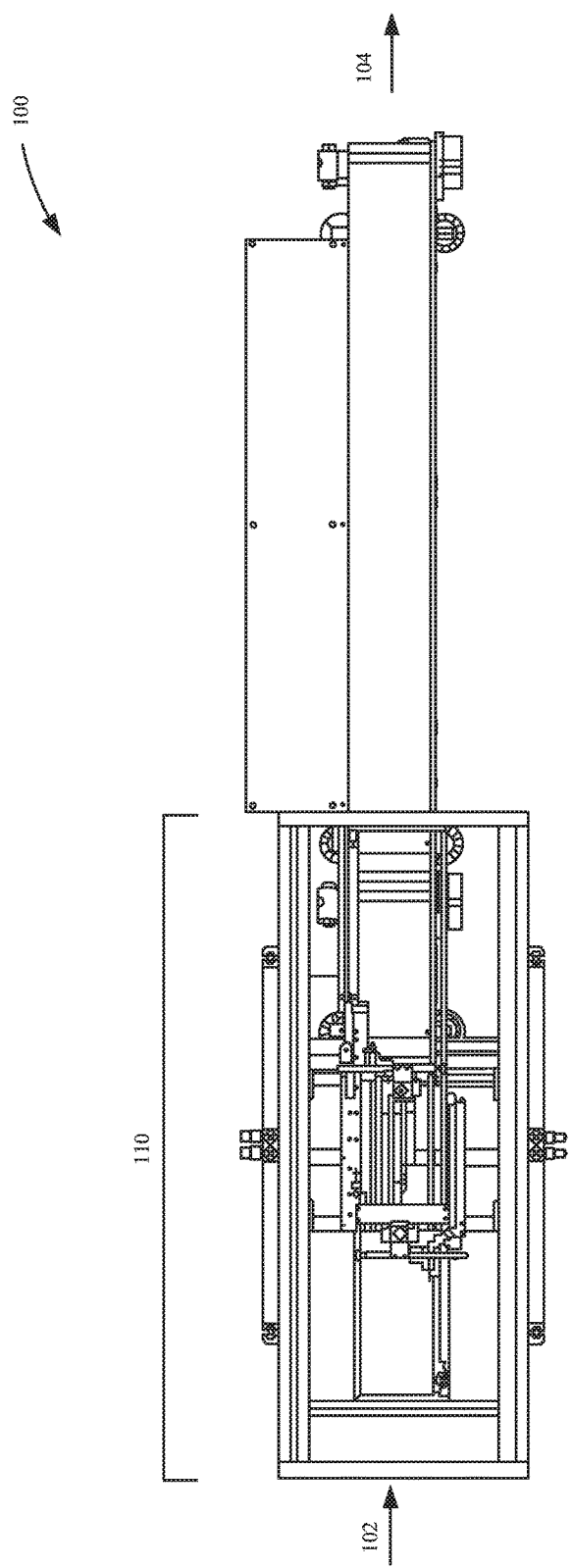
Figure 1D:
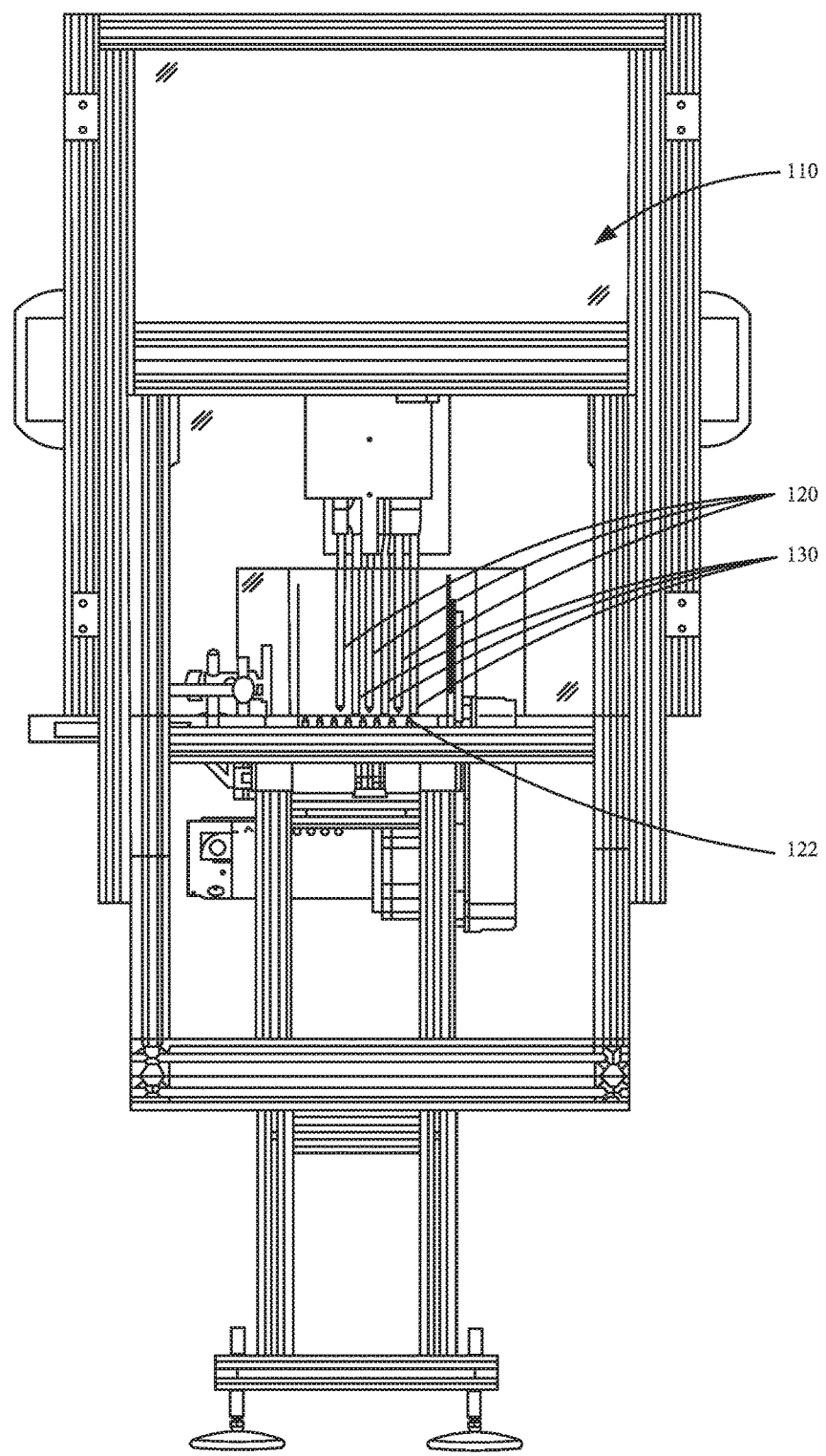

As shown in FIGS. 1C and 1D, transfer mechanism 110 comprises a first transfer mechanism 120 and a second transfer mechanism 130. In one embodiment, first transfer mechanism 120 comprises a transfer arm which is configured to extend down and behind a product on a read station platform 122 and move the product across read station 122 while allowing a sensor to detect an indication, for example a barcode scanner detecting a barcode. First transfer mechanism 120 is also configured to move the stack until it is in a staging position. When transfer mechanism 120 has completed its movement, it may extend up and back to the beginning of the read station and repeat the cycle as instructed by a controller with another product. In one embodiment, transfer mechanism 120 is controlled by a plurality of air cylinders configured to drive movement. However, a motor driven transfer mechanism 120 is also envisioned.

Second transfer mechanism 130 is configured to extend down and behind the stack in the staging position and move the product forward, when instructed by a controller, to transfer a stack between a staging position to a movement position. For example, this may comprise transferring from a lugged conveyor to a flighted conveyor. When movement by second transfer mechanism 130 is complete, transfer mechanism 130 extends up and moves back to the staged position and, for example, repeats the cycle as instructed by a controller (not shown in FIGS. 1A-1D).

Transfer mechanisms 120 and 130, in one embodiment, inhabit the same space in linear travel at the beginning of the staging area in order to ensure that the individual contact mechanisms of mechanism 130 can extend down behind the contact mechanisms of transfer mechanism 120. While three contact mechanisms are illustrated for each of transfer mechanisms 120 and 130, more or fewer individual contact mechanisms could also be used, in other embodiments. In one embodiment, for example that shown in FIG. 1D, the contact mechanisms for transfer mechanisms 120 and 130 are interleaved, however, in other embodiments contact mechanism are not interleaved, and are arranged in a different configuration.

Figure 2:
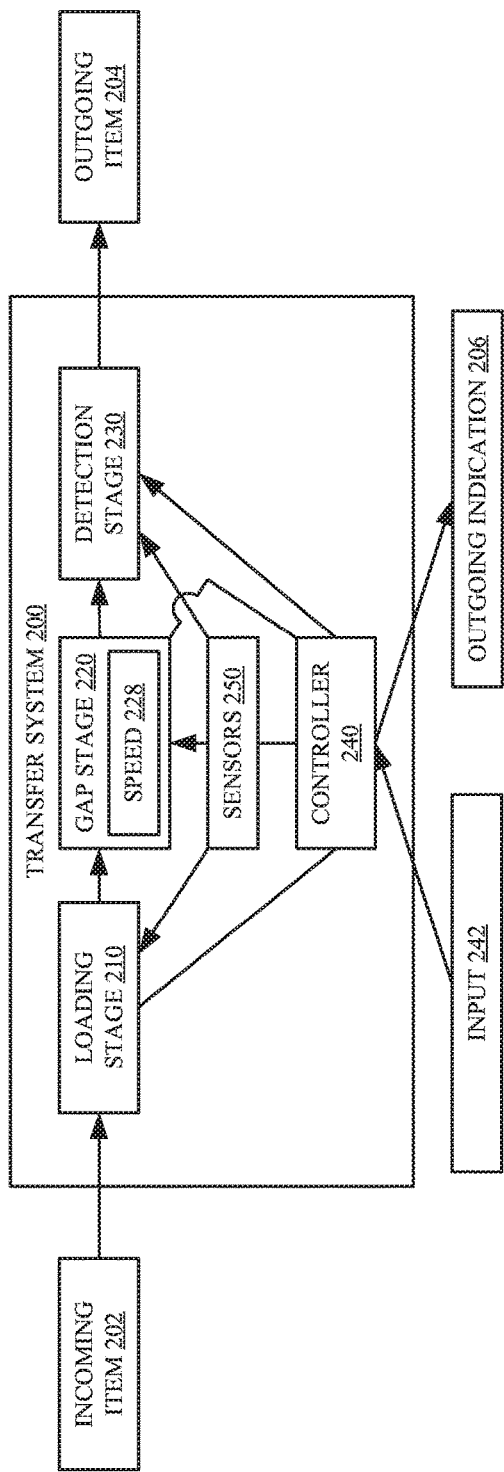
FIG. 2 illustrates a block diagram of a transfer system in accordance with one embodiment of the present invention.

FIG. 2 illustrates a block diagram of a transfer system in accordance with one embodiment of the present invention. Transfer system 200 is illustratively configured to receive an incoming item 202, and output an outgoing item 204. Transfer system 200 may also provide an outgoing indication 206, for example indicating an identity of outgoing item 204, a count of total items transferred, or another indication relevant to an operator of transfer system 200. In one embodiment, incoming item 202 is received at a loading stage 210, proceeds to a gap stage 220, and exits a detection stage 230, as outgoing item 204. In one embodiment, loading stage 210 comprises a conveyor configured to receive incoming product. For example, individual workers may manually load product onto a loading conveyor 210. In another embodiment, product may also be moved onto a loading stage conveyor 210 by another conveyor, for example, coming from another part of a facility, or using another loading source altogether. In one embodiment, loading stage 210 comprises a motor driven conveyor. In one embodiment, loading stage 210 comprises a belt conveyor. In one embodiment, loading stage 210 comprises a six-foot wide belt conveyor.

Gap stage 220, in one embodiment, comprises a separate stage configured to operate at a variable rate of speed 228. In one embodiment, variable speed 228 allows for gap stage 220 to speed up a first product, creating a gap between incoming items 202. Variable speed 228 can be adjusted, for example based on known or detected product parameters, to ensure that a product is pushed all the way onto a detection stage 230. For example, using known or detected dimensions, a speed can be adjusted to ensure that sufficient space is created between products with larger footprints.

Detection stage 230, in one embodiment, is configured to facilitate detection and identification of incoming item 202. In one embodiment, a detecting stage 230 comprises a stationary platform. In one embodiment, detection stage 230 comprises a camera mounted above, and/or below a platform configured to read an indicator on the item. For example, in one embodiment, detection stage 230 can comprise glass, clear plastic, or another suitable material through which a camera can detect an indication, such as a barcode, QR code, or other suitable identifier. In another embodiment, detection stage 230 comprises a hole, or other gap such that a camera mounted below can view the product directly to read an indication. In another embodiment, sensor or camera 250 is placed above detection stage 230, and is configured to read a barcode, or other indicator, located on incoming item 202. For example, other suitable identifiers could also be used, such as near field communication as well as RFID tags could also be used to relay product information, as well as other suitable identifiers.

As illustrated in FIG. 2, one or more sensors 250 may exist throughout transfer system 200. As described previously, at least one sensor 250 is configured to identify an item on detection stage 230. However, sensors 250 may also be configured to identify, or detect an incoming item present on loading stage 210, or on gap stage 220, for example. Sensors 250 may relay such information back to a controller 240, which may send signals to loading stage 210, gap stage 220, and/or detection stage 230, in order to ensure that incoming items 202 do not bunch up within the system.

Figure 5:
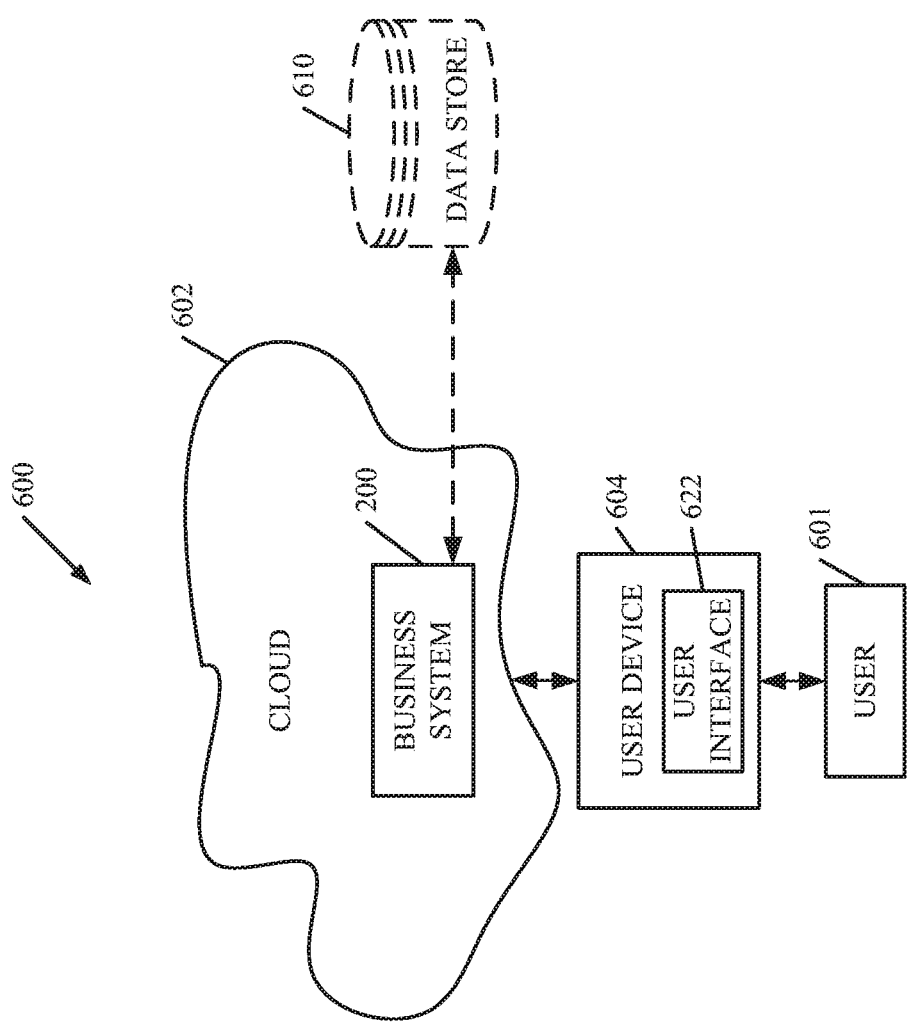
FIG. 5 is a block diagram showing one example of the architecture shown in FIG. 1, deployed in a cloud computing architecture.

Controller 240, in one embodiment, receives an input 242, and is configured to generate an outgoing indication 206. In one embodiment, input 242 comprises a set of configurations and/or settings that controller 240 is configured to implement throughout transfer system 200, e.g. speed 228, etc. However, input 242 can also comprise a set of individual inputs, for example, entered by an operator using an input interface for system 200, which are then sent to controller 240, which alters an existing configuration of transfer system 200 accordingly. In one embodiment, controller 240 is also configured to output an outgoing indication 206, for example an identification of outgoing item 204, a count of outgoing items 204, or any other suitable indication desired. Additionally, controller 240 may also output status information as outgoing information 206, for example a detected bunching up of products within the system, a malfunction, etc. In one embodiment, controller 240 comprises a software driven controller configured to monitor sensors 250, control motors, and/or air cylinders throughout the system. Controller 240 illustratively, as shown in FIG. 5, is communicatively coupled to a user interface, e.g. a touch screen display on a computing device, for setup and monitoring a status of system 200.

One advantage of the embodiments described and illustrated herein is the ability to receive stacked product in a variety of sizes, from a first transfer mechanism, and deliver them, to a second transfer system, at uniform intervals.

FIGS. 3A-3D illustrate a transfer sequence from a first conveyor to a second conveyor in accordance with an embodiment of the present invention.

Figure 3A:
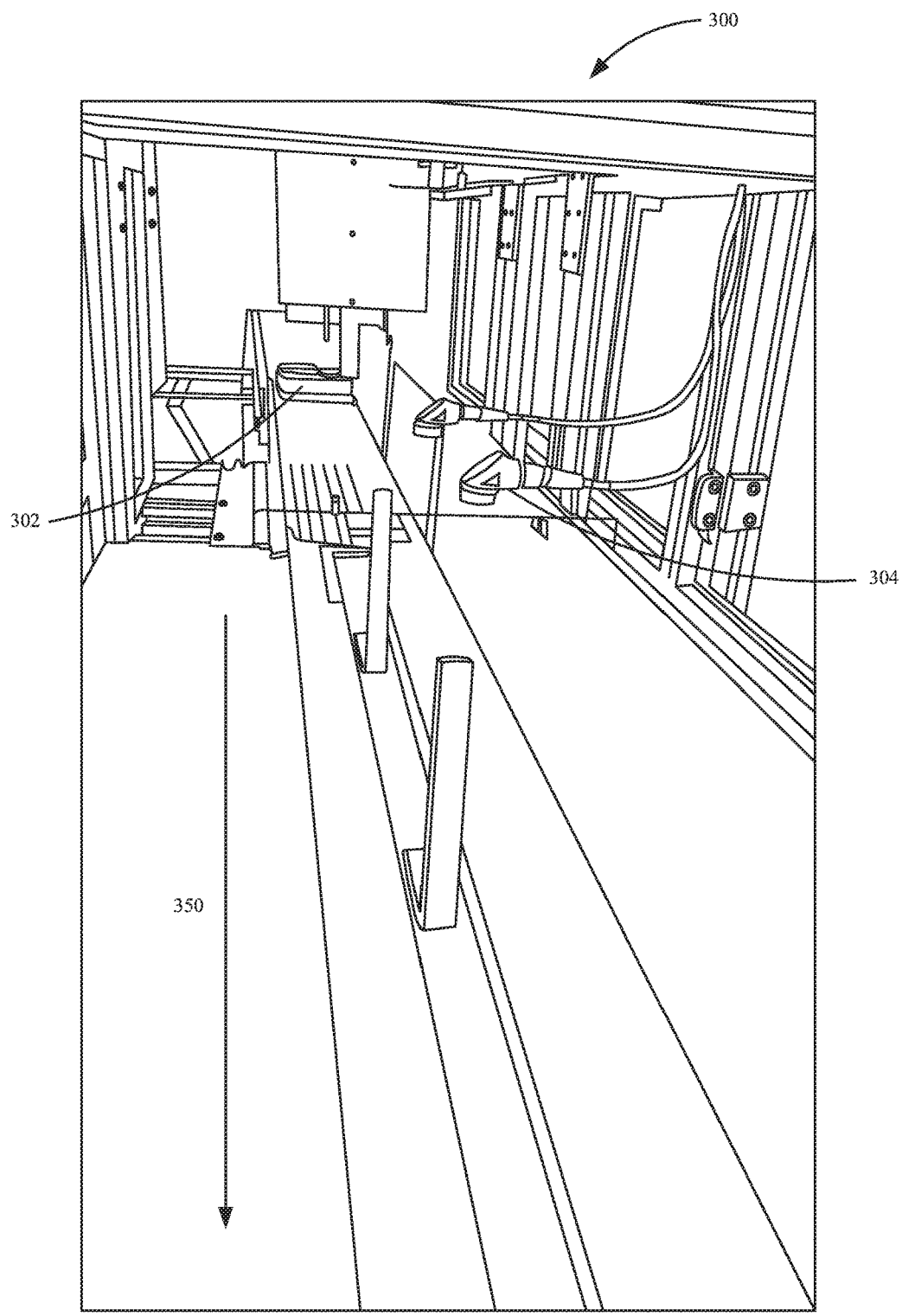
FIGS. 3A-3D illustrate a transfer sequence from a first conveyor to a second conveyor in accordance with an embodiment of the present invention.

FIG. 3A illustrates a transfer system 300, in which a moving object 302 in direction of travel 350. In one embodiment, moving object 302 is configured to be detected by one or more sensors 304. As illustrated in FIG. 3A, in one embodiment, sensors 304 comprise cameras configured to image and detect an indication on moving object 302 of an identity of object 302. However, while sensors 304 are illustrated as above a direction of travel 350, it is also contemplated that they could be located below direction of travel 350, or alongside direction of travel 350, and configured to read an indication on the bottom of moving object 302.

Figure 3B:
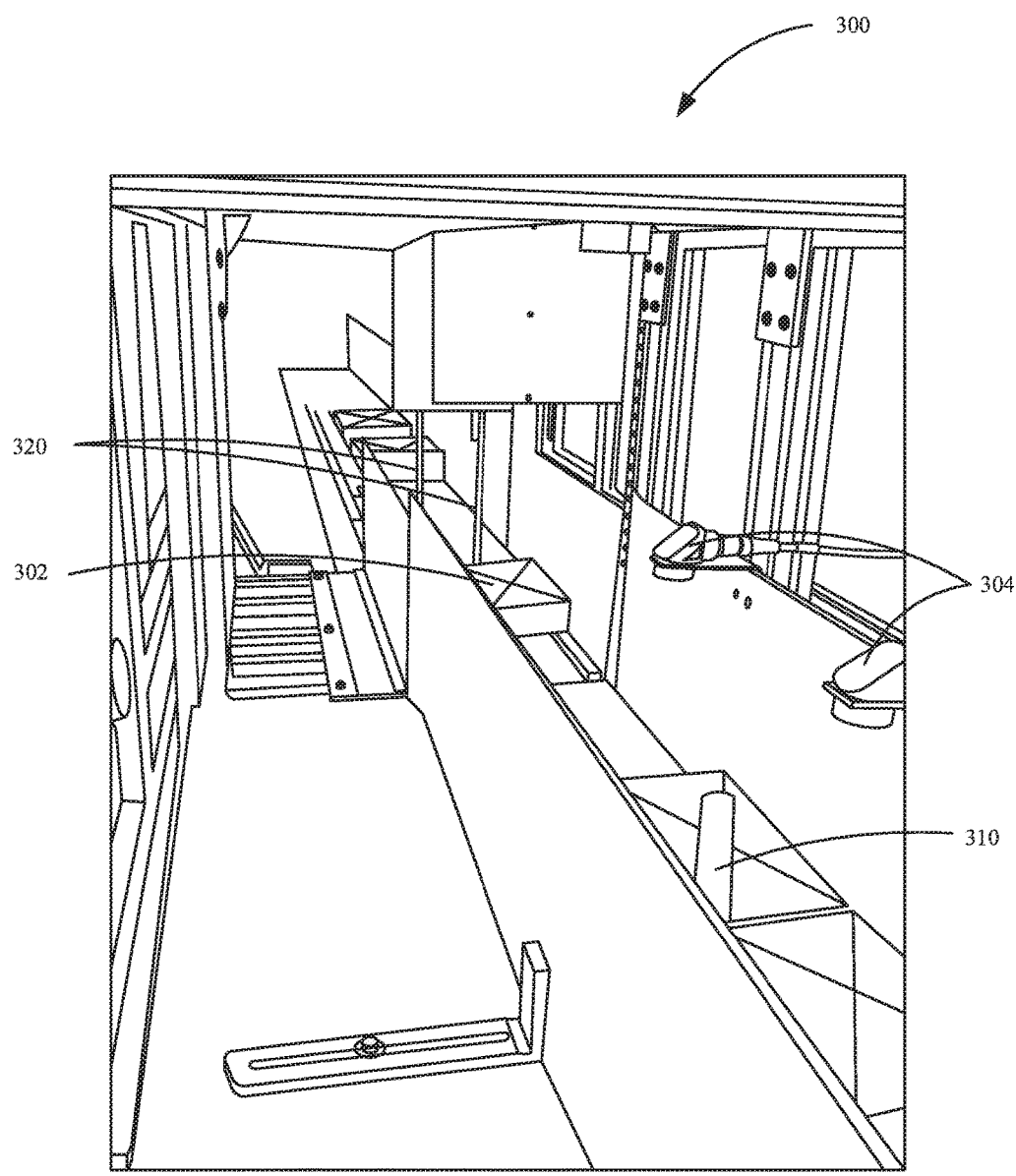

FIG. 3B illustrates a moving object 302 interacting with transfer arms 320 as it moves from a first movement mechanism to a second movement mechanism. As illustrated, stop arm 310 is configured to stop movement of moving objects, such that they can be detected and imaged by sensors 304.

Figure 3C:
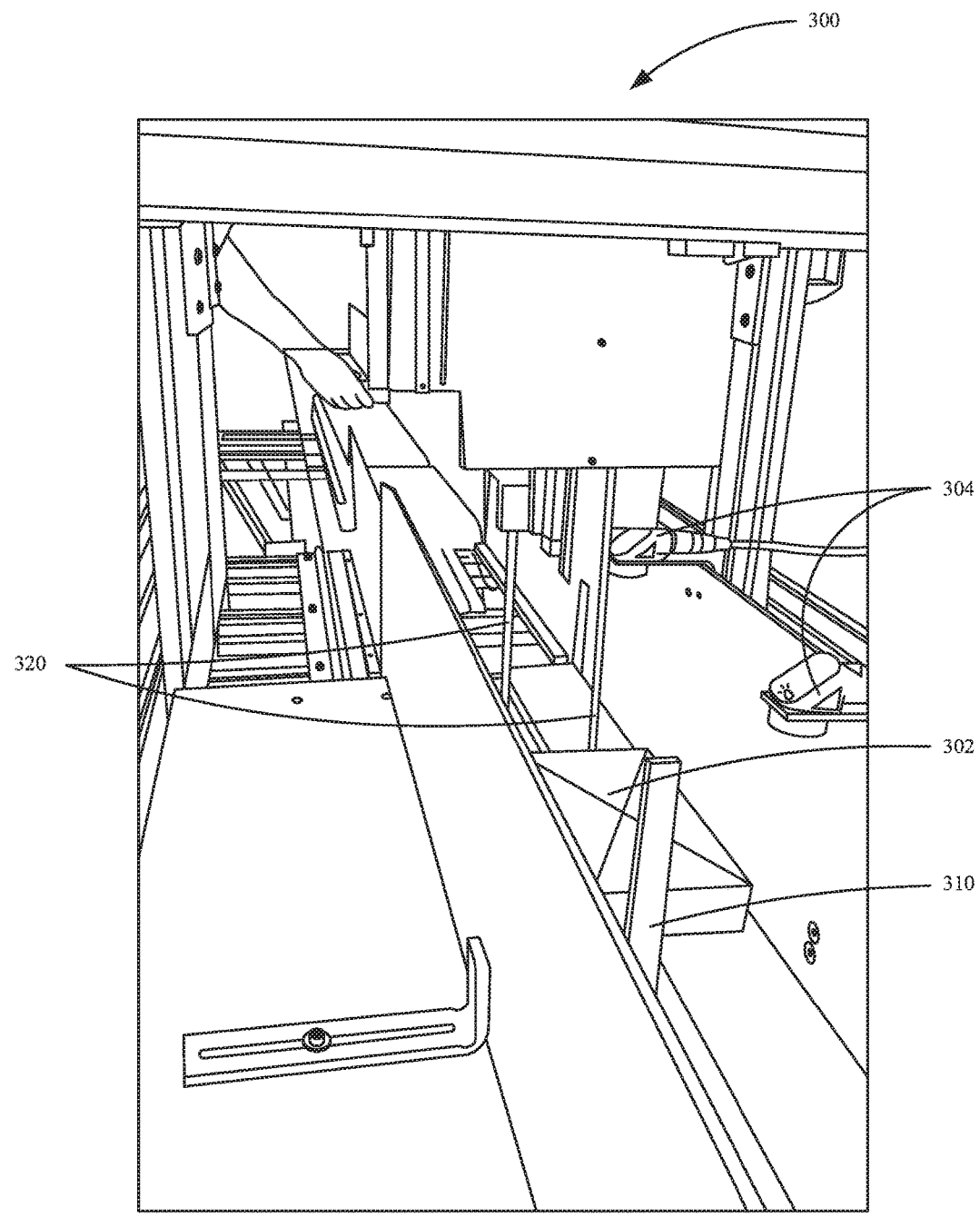

FIG. 3C illustrates system 300, where transfer arm 320 is causing moving object 302 to move into range of sensors 304. In one embodiment, stop arm 310 is configured to receive moving object 302 such that it can be imaged, or otherwise detected, by one of sensors 304.

Figure 3D:
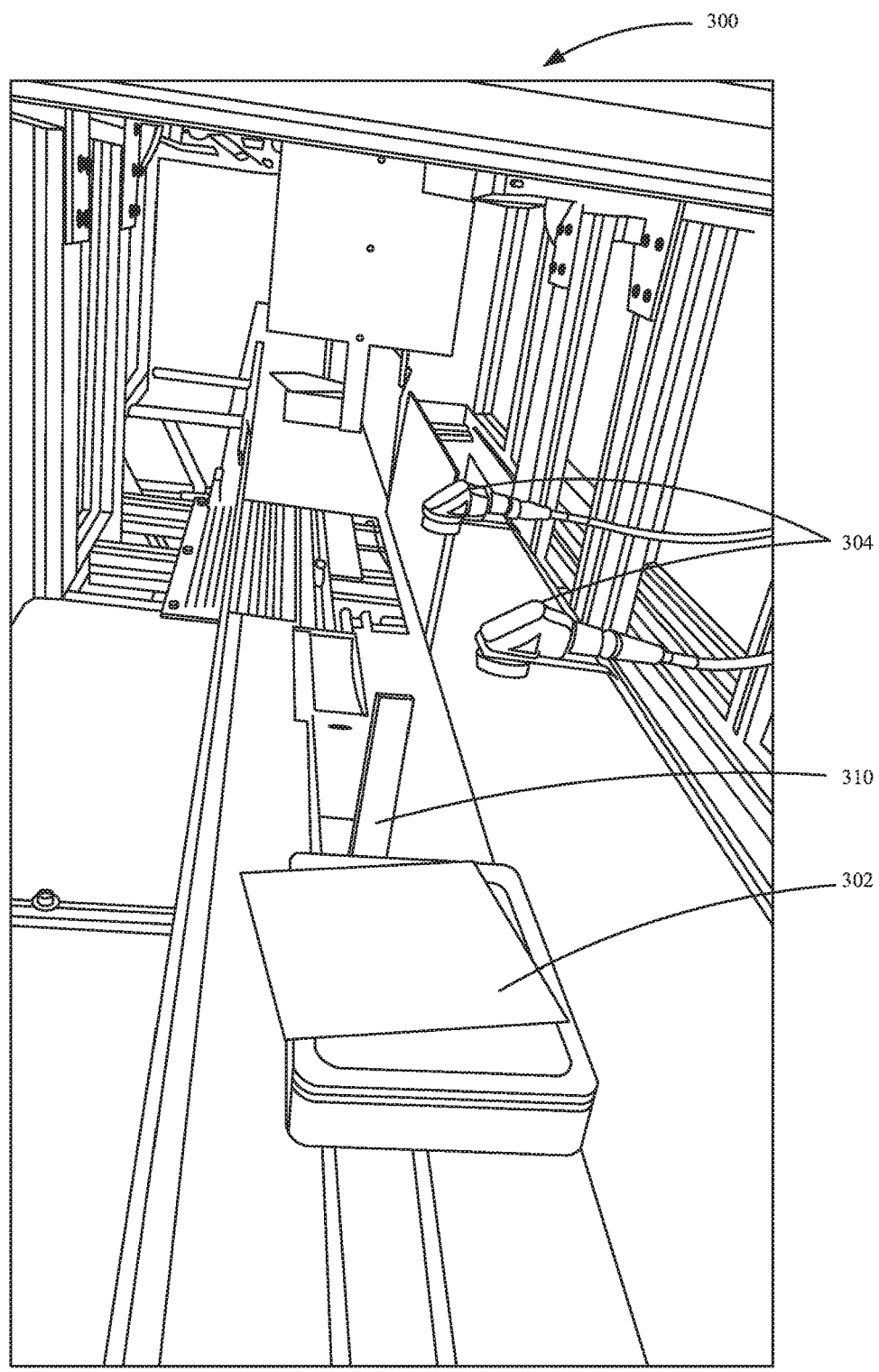

FIG. 3D illustrates a moving object 302 as it exits transfer system 300 and proceeds to a second movement mechanism.

Figure 4:
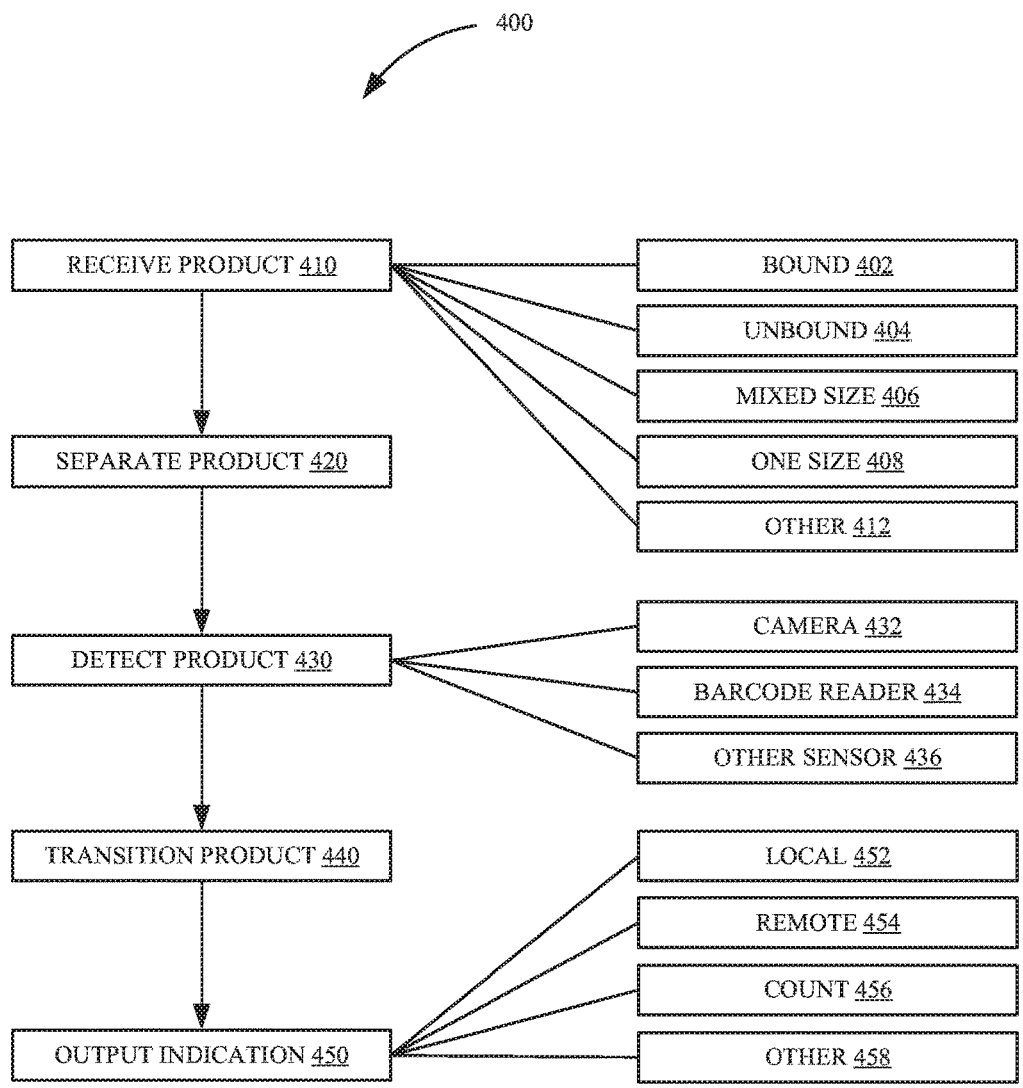
FIG. 4 illustrates a method of indicating a transferred product in accordance with an embodiment of the present invention.

FIG. 4 illustrates a method of indicating a transferred product in accordance with an embodiment of the present invention. Method 400 may be useful in order to monitor the transfer of products from one movement mechanism to another movement mechanism within a facility.

In block 410, a product is received from a first movement system. In one embodiment, the received product is a bound product 402 comprising a plurality of individual items bound together. In another embodiment, the receive product is an unbound product 404, comprising a loose stack of items. In one embodiment, the size of a plurality of items constituting the received product is mixed, as indicated in block 406, however in other embodiments a single size may also be received, as indicated in block 408, for example a stack of 8.5×11 inch sheets of paper. However, other products may also be received, as indicated in block 412. While paper products are discussed herein and throughout as one example of a product that can be received and utilized using the transfer systems and methods described herein, it is to be understood that other products can be received and transferred using similar systems and methods.

In block 420, subsequent incoming products are separated. In one embodiment, this comprises separating products spatially along a transport route so that each individual product can be individually detected, and identified separately from another product. For example, in one embodiment, this comprises speeding up movement of a first product, such that a gap is created between the first product and the second product. However, in another embodiment, the speed of a second product may be slowed down in order to create a gap between the second product and the first product. Other gap creation mechanisms are also envisioned herein.

In block 430, a product is detected and identified. In one embodiment, this comprises a camera imaging the product as indicated in block 432. In another embodiment, detecting a product comprises using a barcode reader to read a barcode on the product, as indicated in block 434. However, other sensors are also envisioned, as indicated in block 436. For example, near field communication could also be used to relay product information, as well as RFID tags, or another suitable technology. In one embodiment, a transfer system is configured such that each subsequent product is uniquely identified from an earlier product, for example by detecting and recording a unique identifier for each product stack.

In block 440, a product is transitioned to a second movement system. In one embodiment, the transfer system of method 400 is configured to move an item from the first movement mechanism to the second movement mechanism, for example from a first type of conveyor to a second type of conveyor, while detecting and/or counting a number of items that are transferred. In block 440, the product is transitioned from a detection stage, to the second movement mechanism.

In block 450, an indication is output by a controller. In one embodiment, the output indication comprises an identification of a detected product, such as a product number, a barcode number, a current count, etc. In one embodiment, the indication is output as a local indication 452, for example presented on a local display associated with a transfer system. In another embodiment, the indication is output remotely, as indicated in block 454. A remote indication may comprise sending an indication of the detected item to a cloud-based storage system, a local storage system separate from the transfer system itself, and/or a mobile device, for example a laptop, a tablet, a mobile phone, etc. In one embodiment, the indication comprises an identification of the item. Other indications may also comprise a count of items that have been transferred, as indicated in block 456. However, other indications can also be output and are envisioned herein, as indicated in block 458.

Embodiments described herein allow for transferring stacks of products of varying sizes from a first transfer mechanism to a second transfer mechanism, at uniform intervals. Speed of the first transfer mechanism can be adjusted to create uniform gaps between successive product stacks. Some embodiments described herein allow for uniform delivery of product stacks to both flatbed and lugged conveyors.

The present discussion has mentioned controllers, processors and servers. In one embodiment, the controllers, processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 5 is a block diagram of system 200, shown in FIG. 2, except that it communicates with elements in a cloud-based architecture 600. In an example embodiment, cloud 600 can provide computation, software, data access, and storage services that do not require end-user knowledge of the physical location or configuration of the system that delivers the services, such as those described above with respect to controller 240, for example. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

Figure 6:
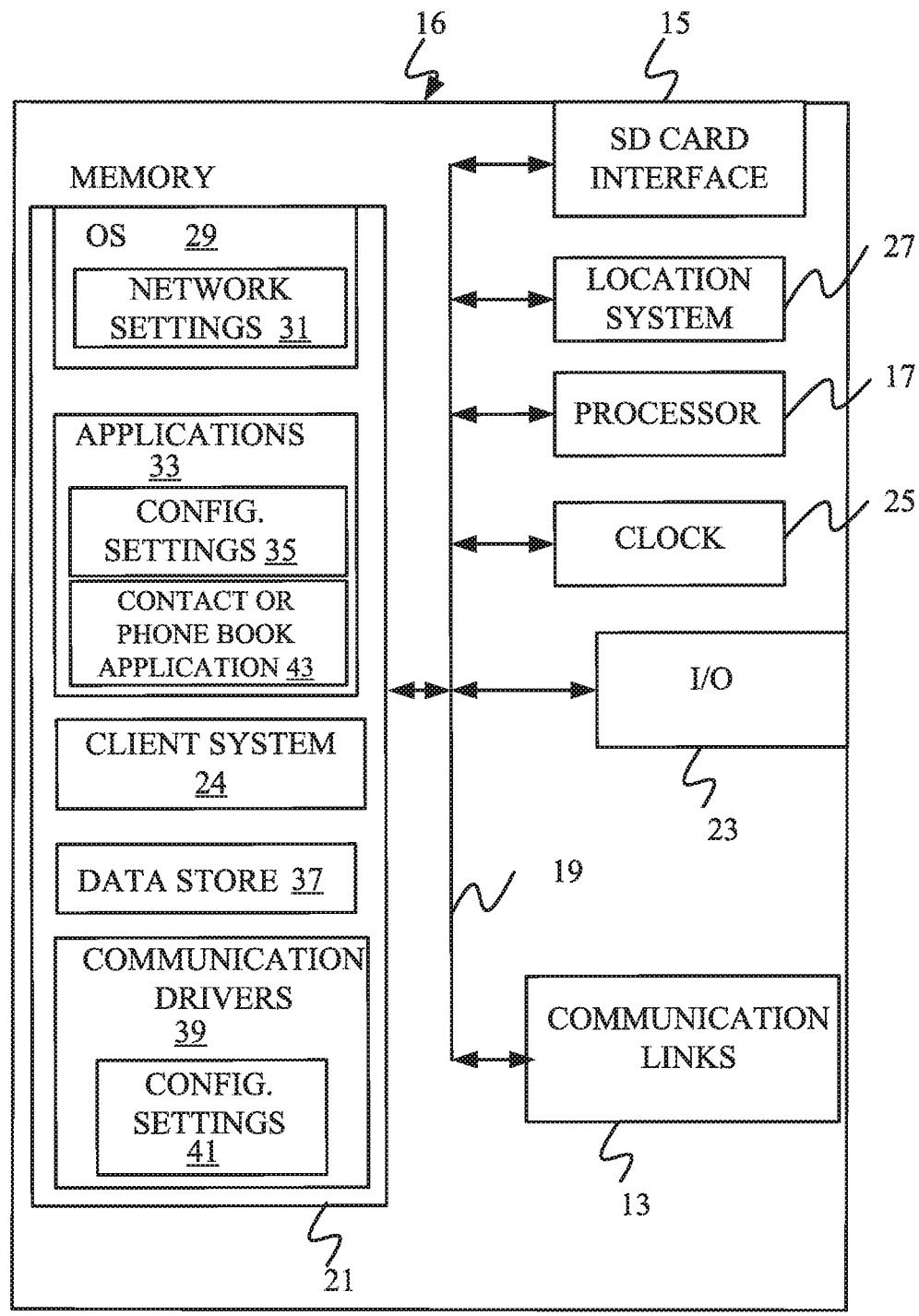
FIGS. 6-8 show examples of mobile devices that can be used in the architectures shown in the previous figures.

FIG. 6 is a simplified block diagram of one illustrative embodiment of a handheld or mobile computing device that can be used as a user's or client's handheld device 16, in which the present system (or parts of it) can be deployed. For instance, a mobile device can be deployed in the operator compartment of harvester 100 for use in generating, processing, or displaying the stool width and position data.

FIG. 6 provides a general block diagram of the components of a client device 16 that can run at least some of the components shown in FIG. 2. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real-time clock component that outputs a time and date. It can also, illustratively, provide timing functions for processor 17.

Location system 27 illustratively includes a component that outputs a current geographical location of device 16. This can include, for instance, a global positioning system (GPS) receiver, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media. Memory 21 stores computer readable instructions that, when executed by processor 17, cause the processor to perform computer-implemented steps or functions according to the instructions. Processor 17 can be activated by other components to facilitate their functionality as well.

Figure 7:
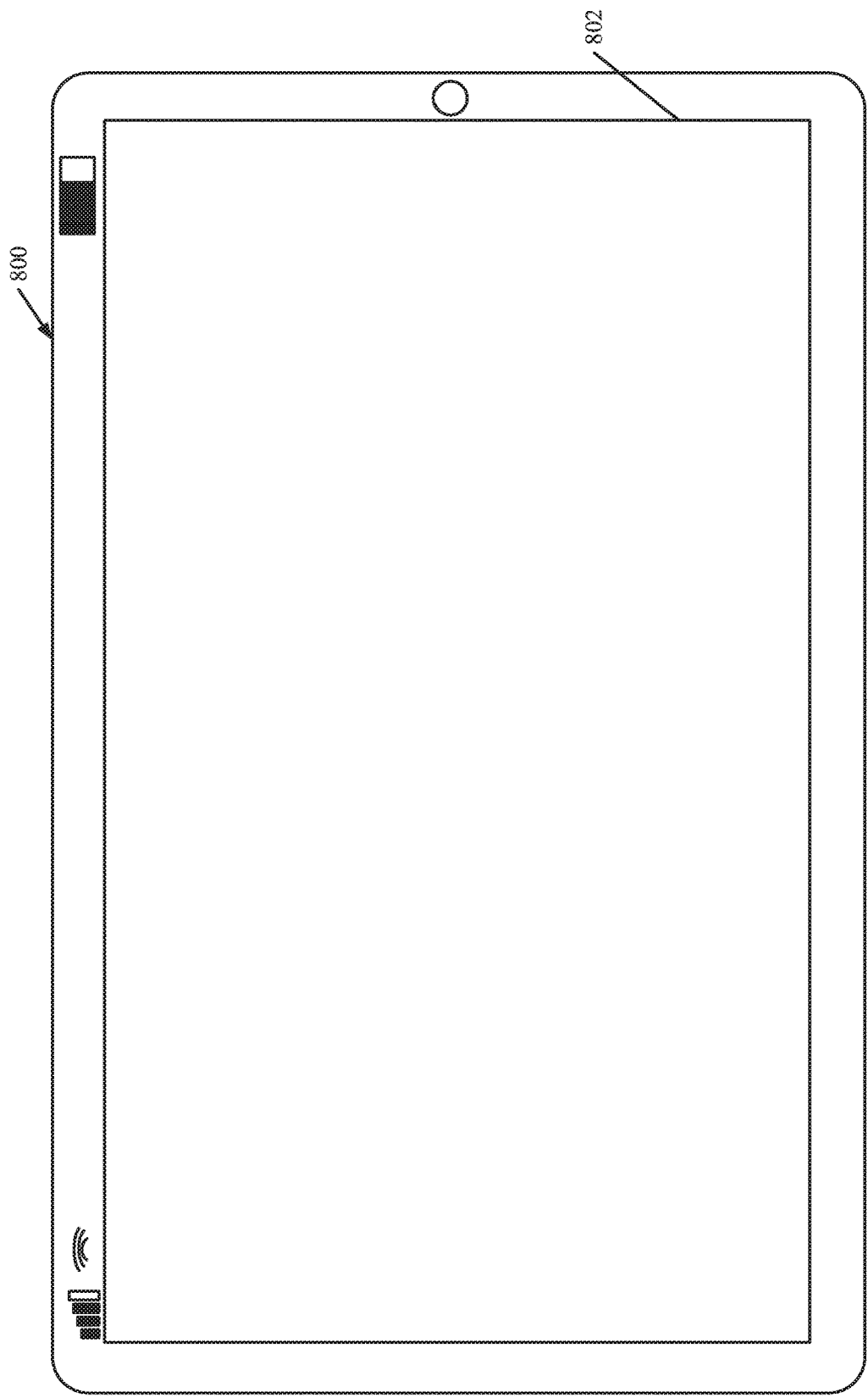
Figure 8:
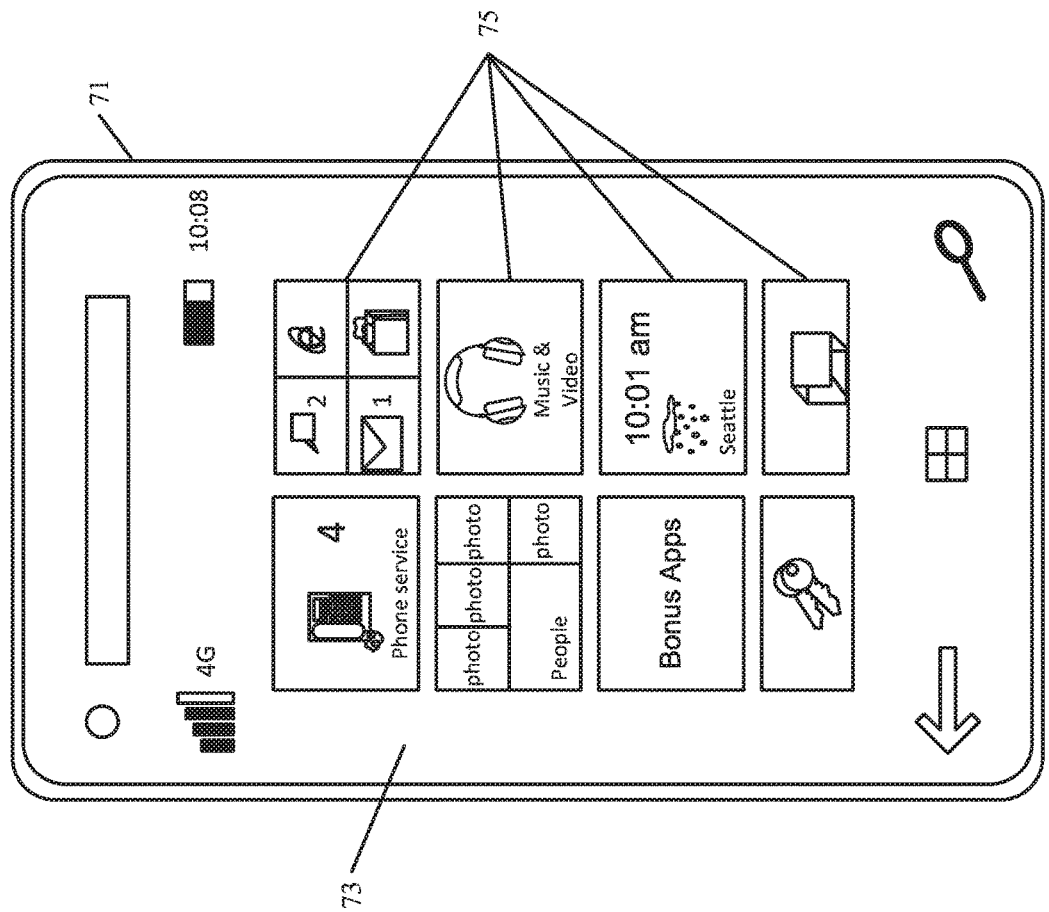

FIG. 7 shows one embodiment in which device 16 is a tablet computer 800. In FIG. 8, computer 800 is shown with user interface display screen 802. Screen 802 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 800 can also illustratively receive voice inputs as well.

FIG. 8 provides an additional example of devices 16 that can be used, although others can be used as well. In FIG. 8, a feature phone, smart phone, or other suitable mobile phone 45 is provided as device 16. Phone 45 includes a set of keypads 47 for dialing phone numbers, a display 49 capable of displaying images including application images, icons, web pages, photographs, and video, and control buttons 51 for selecting items shown on the display. Phone 45 includes an antenna 53 for receiving cellular phone signals. In some embodiments, phone 45 also includes a Secure Digital (SD) card slot 55 that accepts a SD card 57.

Note that other forms of the devices 16 are possible.

Figure 9:
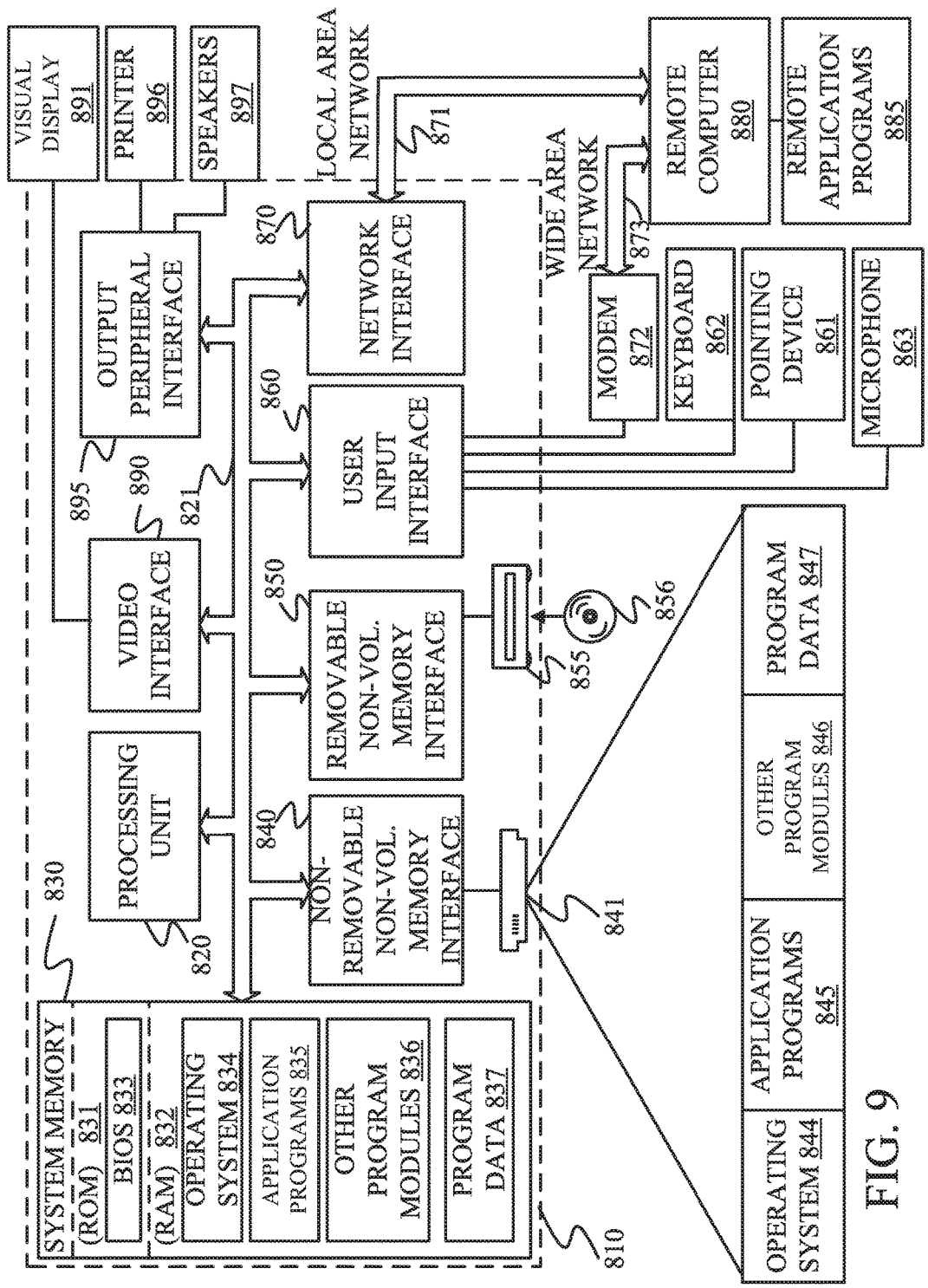
FIG. 9 is a block diagram showing one example of a computing environment that can be used in the architectures shown in the previous figures.

FIG. 9 is one embodiment of a computing environment in which elements of FIG. 2, or parts of it, (for example) can be deployed. With reference to FIG. 9, an exemplary system for implementing some embodiments includes a general-purpose computing device in the form of a computer 1110. Components of computer 1110 may include, but are not limited to, a processing unit 1120 (which can comprise controller 240), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. Memory and programs described with respect to FIG. 2 can be deployed in corresponding portions of FIG. 9.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 10 illustrates operating system 1134, application programs 1135, other program modules 1136, and program data 1137.

The computer 1110 may also include other removable/non-removable volatile/nonvolatile computer storage media. By way of example only, FIG. 10 illustrates a hard disk drive 1141 that reads from or writes to non-removable, nonvolatile magnetic media, a magnetic disk drive 1151, nonvolatile magnetic disk 1152, an optical disk drive 1155, and nonvolatile optical disk 1156. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 10, provide storage of computer readable instructions, data structures, program modules and other data for the computer 1110. In FIG. 9, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137.

A user may enter commands and information into the computer through input devices such as a keyboard 1162, a microphone 1163, and a pointing device 1161, such as a mouse, trackball or touch pad. These and other input devices are often connected to the processing unit 1120 through a user input interface 1160 that is coupled to the system bus, but may be connected by other interface and bus structures. A visual display 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 is operated in a networked environment using logical connections (such as a local area network—LAN, or wide area network WAN) to one or more remote computers, such as a remote computer 1180.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. In a networked environment, program modules may be stored in a remote memory storage device. FIG. 9 illustrates, for example, that remote application programs 1185 can reside on remote computer 1180.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A transfer system comprising:
   a loading stage, configured to receive a product from a first movement system;
   a gap stage, configured to receive the product from the loading stage and move the product at a speed, wherein the speed is configured to separate the product from a subsequent product;
   a detection stage, configured to identify the product by detecting a product identifier using a sensor;
   first and second transfer mechanisms configured to move the product through the loading stage, the gap stage and the detection stage to a second movement stage, wherein the first and second transfer mechanisms move along a direction of travel of the product, and paths of the first transfer mechanism and the second transfer mechanism overlap at the detection stage; and
   a controller configured to generate and send control signals to the transfer system and receive an identification of the product from the sensor.

2. The transfer system of claim 1, wherein the product comprises a bound stack of items.

3. The transfer system of claim 2, wherein the bound stack of items comprises paper products.

4. The transfer system of claim 1, wherein the product comprises a loose stack of items.

5. The transfer system of claim 1, wherein the speed is a variable speed configured to move the product at a different speed than a speed of the subsequent product.

6. The transfer system of claim 1, wherein the sensor is a camera.

7. The transfer system of claim 1, wherein the sensor is a scanner.

8. The transfer system of claim 1, wherein each of the first and second transfer mechanisms comprise extending appendages configured to contact the product.

9. The transfer system of claim 8, wherein the appendages of the first transfer mechanism are interleaved between the appendages of the second transfer mechanism.

10. A method of transferring a material set from a first movement mechanism to a second movement mechanism, the method comprising:
    receiving the material set from the first movement mechanism using a first transfer mechanism;
    generating a spatial gap between the received material set and a subsequently received material set;
    detecting on a detection stage, using a sensor, an indication of the material set, wherein the material set is transferred to the detection stage by the first transfer mechanism;
    transitioning, using a second transfer mechanism, the material set from the detection stage to the second movement mechanism; and
    outputting the indication of the material set, wherein the indication is stored within a memory, and wherein the indication is output as a signal generated by a controller.

11. The method of claim 10, wherein the first transfer mechanism is configured to travel along a direction of movement from the first movement mechanism to the detection stage, and wherein the second transfer mechanism is configured to travel along the direction of movement from the detection stage to the second movement mechanism.

12. The method of claim 11, wherein each of the first and second transfer mechanism comprise extendable appendages configured to contact the material set.

13. The method of claim 10, wherein the material set comprises a first item with a first size and a second item with a second size, wherein the first and second sizes are different, and wherein the material set comprises the first item stacked on the second item.

14. The method of claim 13, wherein the first and second items are bound together.

15. The method of claim 10, wherein one of the first and second movement mechanisms comprises a conveyer.

16. A controlled transfer system, comprising:
    a first transfer mechanism configured to receive a stack of items from a first movement mechanism and facilitate movement of the stack of items to a detection platform at a speed;
    a second transfer mechanism configured to facilitate movement of the stack of items from the detection platform to a second movement mechanism based on a received movement signal;
    a sensor configured to identify the stack of items based on an indication captured while the stack of items is on the detection platform, wherein the sensor captures the indication based on a received capture signal;

a controller configured to generate:
    a speed signal that sets the speed for the first transfer mechanism,
    the movement signal for the second transfer mechanism, and
    the capture signal sent to the sensor; and an output, generated by the controller, indicating the identified stack of items.

17. The controlled transfer system of claim 16, wherein the output is sent to a local storage.

18. The controlled transfer system of claim 16, wherein the output is sent to a cloud-based storage.

* * * * *

UNITED STATES PATENT AND TRADEMARK OFFICE
CERTIFICATE OF CORRECTION

PATENT NO. : 10,494,194 B2  
APPLICATION NO. : 15/847317  
DATED : December 3, 2019  
INVENTOR(S) : Sands et al.

It is certified that error appears in the above-identified patent and that said Letters Patent is hereby corrected as shown below:

In the Specification

Column 1, Line 45, change FIG. 1 to FIG. 2

Column 4, Line 61, change receive to received

Signed and Sealed this
Nineteenth Day of January, 2021

Andrei Iancu
*Director of the United States Patent and Trademark Office*